US006819051B1

(12) United States Patent
Currie

(10) Patent No.: US 6,819,051 B1
(45) Date of Patent: Nov. 16, 2004

(54) CONTROL CIRCUITS FOR AUXILIARY TRANSPORTATION LIGHTING

(76) Inventor: Joseph Edward Currie, 506 White Plains Rd., Webster, NH (US) 03303-7112

( * ) Notice: Subject to any disclaimer, the term of this patent is extended or adjusted under 35 U.S.C. 154(b) by 93 days.

(21) Appl. No.: 10/387,193

(22) Filed: Mar. 11, 2003

(51) Int. Cl.$^7$ ............................................. H05B 37/00
(52) U.S. Cl. ........................... 315/82; 315/83; 307/10.8
(58) Field of Search ........................... 315/82, 83, 552; 307/10.8; 362/554

(56) References Cited

U.S. PATENT DOCUMENTS

| | | | | |
|---|---|---|---|---|
| 4,871,945 A | * | 10/1989 | Smith et al. .................. 315/77 |
| 5,400,225 A | * | 3/1995 | Currie ........................ 362/554 |
| 5,495,400 A | * | 2/1996 | Currie ........................ 362/551 |

* cited by examiner

Primary Examiner—David Vu

(57) ABSTRACT

New electrical circuits for controlling two-color side marker light systems on automotive vehicles are disclosed. There is a different control circuit for vehicles with OEM installed separate amber turn signal lights, OEM installed combination red directional, red brake lights, and OEM installed separate red turn signal lights. These circuits are designed to operate two-color side marker light systems in compliance with NHTSA Federal Motor Vehicle Standard No. 108. The side marker lights normally illuminate amber and turn red with the OEM brake lights. In the turn signal mode, the signaled side alternates between the OEM directional light color and off, while the non-signaled side is amber and will illuminate red with the brake light. A fourth new circuit for emergency vehicles will illuminate the marker lights red with the brake lights, or when switch activated will flash each side independently between two colors.

1 Claim, 4 Drawing Sheets

For Vehicles With Separate Amber Directional Lights

For Vehicles With Separate Amber Directional Lights

For Vehicles With Combination Red Brake/Directionals

For Vehicles With Separate Red Directional Lights

For Emergency Vehicle Flashing Lights

CONTROL CIRCUITS FOR AUXILIARY TRANSPORTATION LIGHTING

CROSS-REFERENCE TO RELATED APPLICATIONS (Not applicable)

STATEMENT REGARDING FEDERALLY SPONSORED RESEARCH OR DEVELOPMENT (Not applicable)

BACKGROUND OF THE INVENTION

This instant invention relates to new and unique electrical/electronic circuits for controlling the operation of dual lamp, two colored marker lighting systems for motor vehicles. There have been automotive aftermarket two colored lighting systems available to the general public that do not have National Highway Traffic Safety Administration (NHTSA) approval, (herein after referred to as NHTSA), because they did not cooperate completely with vehicle original equipment manufactures (herein after referred to as OEM), required lighting according to NHTSA Federal Motor Vehicle Standard No. 108. These two colored lighting systems generally illuminate in yellow and red. The major problem with the present control systems according to the NHTSA Chief Counsel Frank Seales, Jr. (Dec. 23, 1998), is that when the secondary or after market two colored lighting system is in the directional light flashing mode and supposed to cooperate with the original equipment manufactures system, the illumination on one or both sides of the vehicle would alternately flash between the two colors, yellow and red, and according to NHTSA could confuse following vehicle drivers creating a safety hazard.

A first embodiment of this invention is for vehicles with separate yellow directional lights. This first embodiment of this invention will remedy the NHTSA identified design safety problem and allow a two colored side marker light to illuminate yellow in a normal mode, flash between yellow and off in a directional light mode, and illuminate red in unison with the vehicle brake lights. When the vehicle is signaling a turn with illumination on the signaled side flashing between yellow and off, the illumination on the opposite side will light steady yellow until and unless the vehicle brakes are applied, at which time it will illuminate red in unison with the vehicle brake light.

A second embodiment of this invention will remedy the NHTSA identified problem of the two colored side marker light in the directional signal mode alternately flashing yellow and red for vehicles with combination red stop, red directional lights. This second embodiment will cause the side marker light on the signaled side to flash alternately red and off, in unison with the vehicles flashing red directional light, while the side marker light on the opposite side will illuminate yellow unless or until the vehicle brakes are applied, at which time the opposite side, side marker light will illuminate red with the vehicle red brake light.

A third embodiment of this invention will remedy the NHTSA identified problem of the two colored side marker light in the directional signal mode alternately flashing yellow and red for vehicles with separate red directional lights. This third embodiment of this invention will power down the yellow light and illuminate or flash the red directional light on the signaled side in unison with the OEM red directional light. This will occur whether the brake signal is on or off. The opposite side lights will maintain a steady yellow illumination if and until the brake is applied. When the brake is switched on the opposite side yellow light will extinguish and the red side marker light will operate in unison with the OEM red brake light.

A fourth embodiment of a two colored side marker light control system is not related to the aforementioned NHTSA identified problem of side marker light confusion, but instead relates to side marker lights that cooperate with police, fire, ambulance, school bus, and department of transportation vehicle lighting systems. There are numerous commercially available flashers for controlling flashing lights on these vehicles but they are expensive and most versions have limited control options. The fourth embodiment of this invention overcomes these problems. In the normal mode the side marker lights are not illuminated.

The side marker lights on both sides of the vehicle illuminate red in unison with the OEM brake lights. When the side marker light system power switch is moved from the off to on position, the side marker lights on both sides of the vehicle will flash between two colors, blue and red for police vehicles, red and white for fire department vehicles, yellow and white for department of transportation vehicles and red and yellow for medical vehicles.

In U.S. Pat. No. 5,400,225 issued to Currie on Mar. 21, 1995, Currie discloses in FIG. 6 a four relay control system that allows the side lights on both sides to illuminate normally yellow and flash between yellow and off on the signaled side. When the vehicle brakes are applied the operation of the yellow light on the signaled side changes from flashing between yellow and off to flashing between yellow and red.

In U.S. Pat. No. 5,495,400, issued to Currie on Feb. 27, 1996, Currie discloses in FIG. 13 a four-relay system that illuminates both sides normally yellow, flashes between yellow and off on the signaled side, and changes to steady red when brakes are applied. If brakes are applied before a directional signal operates there will be no yellow directional flashing at all, and if brakes are applied after the directional starts flashing between yellow and off, the flashing will cease. In FIG. 14 Currie discloses a four-relay system that allows a rearward facing two-colored light system to illuminate red in low illumination power mode during no signal conditions, and illuminate red brightly when vehicle brakes are applied. This system will operate the lights on the directional light signaled side between dim red and yellow if the brakes are not applied, and between red and yellow if brakes are applied. In FIG. 15 a four relay circuit is disclosed that operates the yellow lights steady on in the no signal mode, changes to red when brake signal is applied, flashes between red and off when both brake and directional signals are applied, and flashes between yellow and off when the directional signal is applied with no brake signal. (Flashing light changes color from yellow to red as the brake pedal is moved). FIG. 16 discloses a two-relay system for vehicles with red brake/directionals that operates the yellow lamps steady on in the no signal condition, illuminates steady red when the brake signal is applied, and flashes between red and yellow on the signaled side when the directional signal is applied.

SUMMARY OF THE INVENTION

It is a first object of this invention to describe the means to produce three different electrical control circuits, each one of the three circuits designed to control a two-colored side marker light system on a vehicle with different OEM installed directional signal light options.

It is a second object of this invention that each of the three circuits controls the vehicle two-colored side marker light system in perfect cooperation with the vehicular OEM lighting system and in compliance with NHTSA Federal Motor Vehicle Standard No. 108.

It is a third object of this invention to describe the means to produce an electrical control circuit that will operate a two colored side marker light system in a first mode as added brake lights on both sides of the vehicle, and in a second mode as an emergency flashing system that will alternately flash a first colored light producing means on a first of said vehicle, followed by a second colored light producing means on a second side of said vehicle, and continue the flashing sequence at a fixed flash rate until the flashing circuit power is switched off.

The first three embodiments of this invention overcome an electrical design problem associated with after market automotive two color side marker lighting systems. This problem is identified and described in a letter of interpretation of Federal Motor Vehicle Safety Standard No. 108 by chief counsel Frank Seales Jr. of the NHTSA to Fiber Light Solutions, LLC on Dec. 23, 1998. The problem, as identified by counsel Seales, is that the sidelights on the directional signaled side of the vehicle flash alternately between the two colors red and yellow. The sidelights alternating between red and yellow is not in accord with Standard No. 108 and will tend to confuse other vehicle drivers creating a safety risk. In addition the fourth embodiment of this invention describes a new cost effective means for flashing two lights in an alternating mode of operation for use on emergency vehicles.

The first embodiment of this instant invention is designed for use on a motor vehicle that is equipped with an individual OEM amber or yellow light producing means used only as a directional signal light on at least the left rear and the right rear of the vehicle. Said first embodiment is comprised of a module with an electrical circuit containing six electrical diodes, four 12-vdc relays with a minimum of at least one normally closed contact each, two capacitors and four dc voltage regulators. Said module has electrical input connections from the vehicle brake system, the left and right directional signal system, park light system and from common or vehicle chassis ground. Said module has separate electrical voltage source outputs to the left and right sides of a vehicular two-color side marker light system. Said left side electrical voltage source outputs are comprised of an output to the left yellow light producing means and output to the left red light producing means. Said right side electrical voltage source outputs are comprised of an output to the right side yellow light producing means and the right side red light producing means. Individual vehicle electrical system common connections are also provided to said left and right sides for connection to said red and said yellow light producing means.

The second embodiment of this invention is designed for use on a motor vehicle that is equipped with an OEM red light producing means on at least the left rear and the right rear of the vehicle that functions both as a stoplight and as a directional light. Said second embodiment is comprised of a module with an electrical circuit containing two electrical diodes, two 12-vdc relays with a minimum of at least one normally closed contact each, two capacitors, and four dc voltage regulators. Said module has electrical input connections from the vehicle left and right brake/directional light circuits, park light circuit, and from the vehicle common or chassis ground. Said module has separate electrical voltage source outputs to the left and right sides of a vehicular two-color side marker light system. Said left side electrical voltage source outputs are comprised of an out put to the left yellow light producing means and the left red light producing means. Said right side electrical voltage source outputs are comprised of an output to the right side yellow light producing means and the red light producing means. Individual vehicle electrical system common or chassis ground connections are also provided to said left and right sides for connection to said red and said yellow light producing means.

The third embodiment of this invention is designed for use on a motor vehicle that is equipped with an OEM individual red light producing means used only as a directional signal light on at least the left rear and right rear of the vehicle. Said third embodiment is comprised of a module that contains an electrical circuit with eight electrical diodes, four 12 vdc electrical relays with a least a minimum of one normally closed contact each, four capacitors, and four dc voltage regulators. Said module has individual electrical input connections from the vehicle left and right directional light circuits, the vehicle brake circuit, the vehicle park light circuit, and common or chassis ground. Said module has separate electrical voltage source outputs to the left and right sides of a vehicular two-color side marker light system. Said left side electrical voltage source outputs are comprised of an output to the yellow light producing means and the red light producing means. Said right side electrical voltage source outputs are comprised of an output to the yellow light producing means and the red light producing means. Individual vehicle electrical system common or chassis ground connections are also provided to said left and right sides for connection to said red and said yellow light producing means.

The fourth embodiment of this invention is designed for use on emergency vehicles equipped with two color side marker lighting systems. Said fourth embodiment is comprised of a module that contains an electrical circuit with six electrical diodes, four 12 vdc electrical relays, two relays with form "C" contacts in each and two with at least a minimum of one normally closed contact each, two capacitors, and four dc voltage regulators. Said module has an electrical input connection from the vehicle brake circuit, a switch controlled input from the vehicle electrical system, and an input from the vehicle common or chassis ground. Said module has separate voltage source outputs to the left and right sides of a vehicular two-color side marker light system. Said left side electrical voltage source outputs are comprised of an output to the first colored light producing means and an output to the second colored light producing means. Individual vehicle electrical system common or chassis ground connections are also provided to said left and said right side colored light producing means.

DETAILED DESCRIPTION OF THE INVENTION

Figure 1:
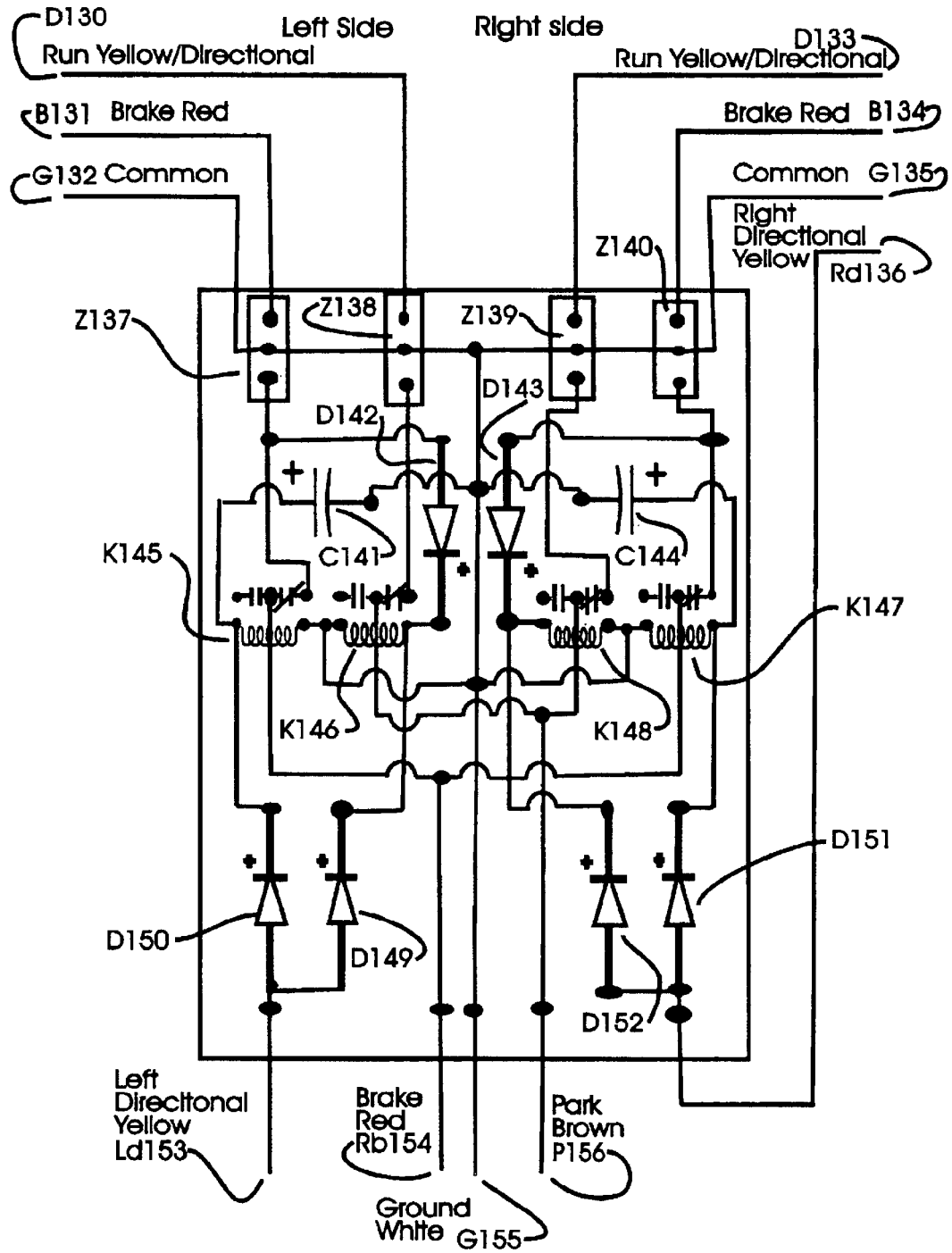
FIG. 1 shows an electrical schematic or circuit diagram of a control circuit used to operate an after market two color side marker light system on a motor vehicle equipped with individual OEM rear left and right amber or yellow directional lights.
Figure 2:
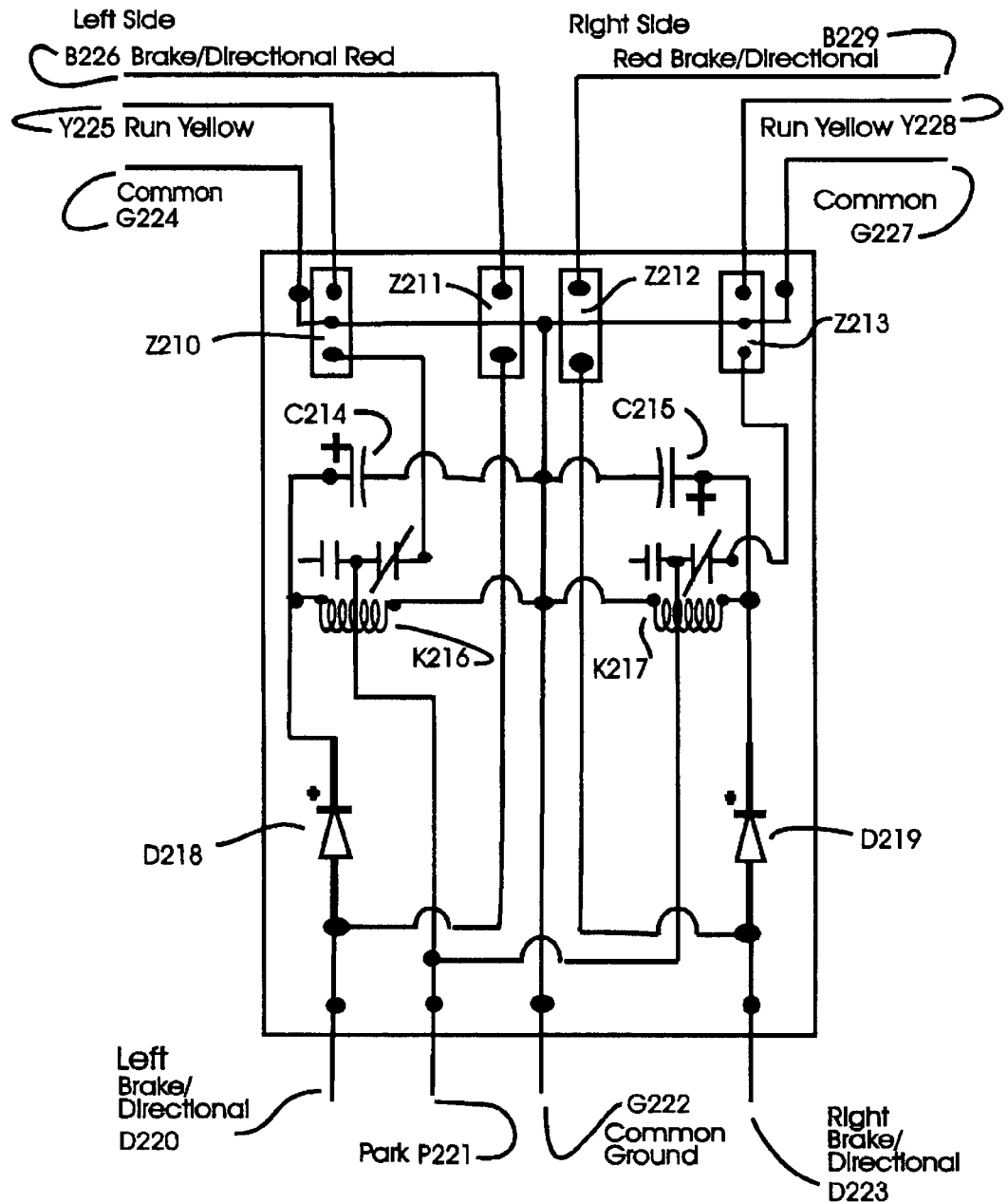
FIG. 2 shows an electrical schematic or circuit diagram of a control circuit used to operate an after market two color side marker light system on a motor vehicle equipped with individual OEM rear left and right combination red brake/red directional signal lights.
Figure 3:
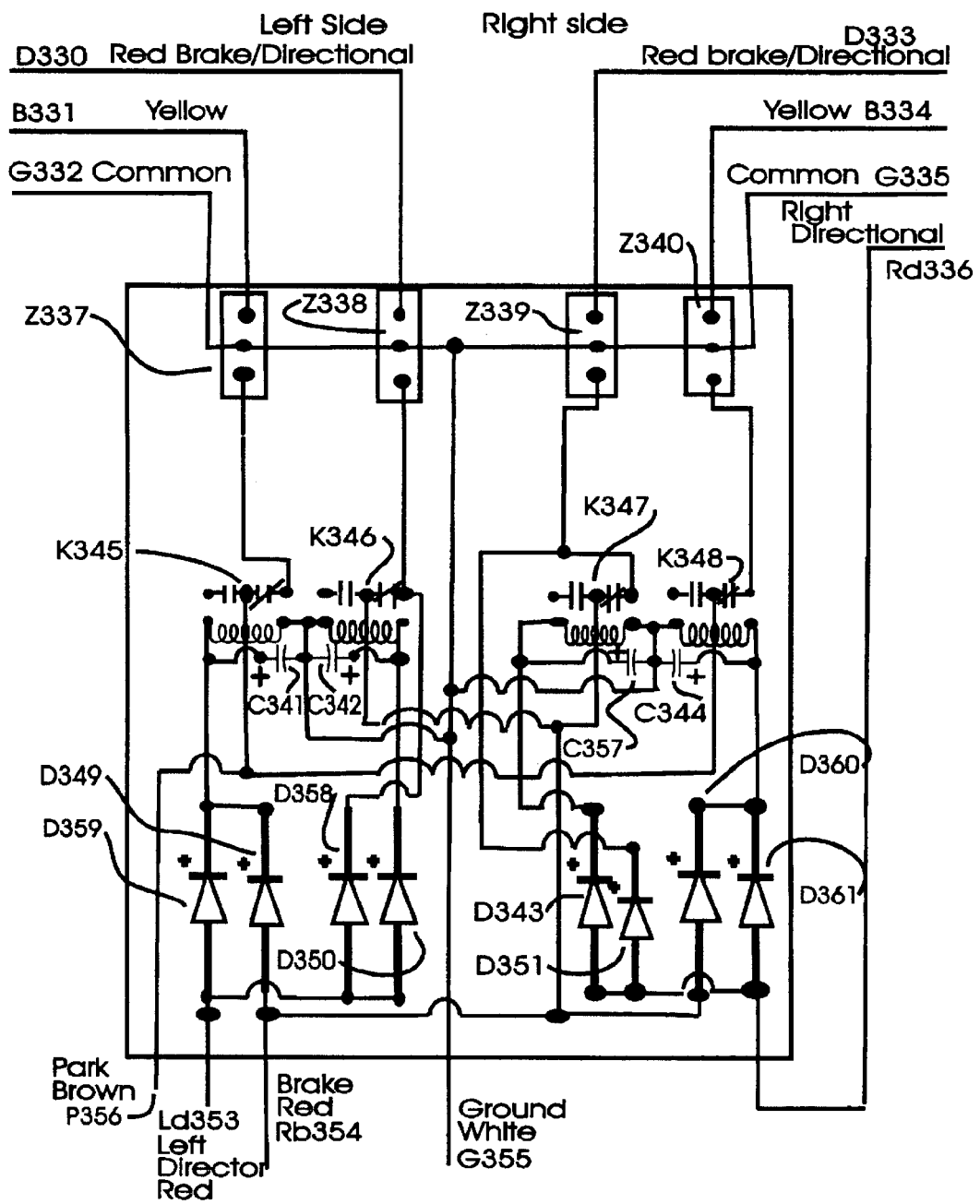
FIG. 3 shows an electrical schematic or circuit diagram of a control circuit used to operate an after market two color side marker light system on a motor vehicle equipped with individual OEM rear left and right red directional lights.

FIG. 1, FIG. 2, and FIG. 3 are drawings that depict electrical control circuits for automotive two-color side marker signal light systems.

In the FIG. 1 drawing the connection of electrical components to form a control circuit for controlling an automotive two-color side marker light system, in compliance with Federal Motor Vehicle Standard No. 108, for automotive vehicles with OEM installed separate amber directional lights is disclosed. During no input signal conditions, (the absence of directional light or brake light signal voltage to said circuit), park light voltage enters said circuit at P156 and conducts through the normally closed contact of relay K146 and voltage regulator Z138 to power on the left side yellow light at D130. Simultaneously the park light voltage conducts from P156, through the normally closed contact of K148 and voltage regulator Z139 to power on the right side yellow light at D133.

When brake light voltage is applied at Rb154 it conducts through the normally closed contact of relay K145 to the junction of voltage regulator Z137 and diode D142. Said brake light voltage conducts through D142 to energize relay K146 opening its' normally dosed contact and removing park light voltage from Z138 to extinguish the left side yellow light at D130. Said brake light voltage is also being applied to voltage regulator Z137 to power on the left side red light at B131. Brake light voltage input at Rb154 also conducts through the normally closed contact of relay K 147 to the junction of regulator Z140 and diode D143. Said brake voltage conducts through regulator Z 140 to power the right side red light at B134 and through diode D143 to energize relay K148, opening its' normally closed contact to remove park voltage from regulator Z139 and extinguish the right side yellow light at D133.

When pulsating left directional voltage is connected at Ld153 and conducts to the junction of diodes D149 and D150, said pulsating directional voltage conducts through diode D150 to energize relay K145 and charge capacitor C 141. The pulsating charges input to C141 will hold relay K145 energized between input voltage pulses because the capacitor charge cannot flow back through diode D150 and must discharge though the coil of relay K145. The continuously energized relay K145 will open its' normally dosed contact removing brake voltage from diode D142 and regulator Z137. No brake circuit power conducting from Rb154 through regulator Z137 will extinguish the left red light at B131. Said brake power removed from diode D 142 will remove brake circuit hold voltage from relay K146. Said relay K146 will be energized in a pulsating manner by directional signal voltage from Ld153 through diode D149, allowing park voltage P156 to conduct through the pulsing contact of K146, through regulator Z138 to the left side yellow light D130.

At this time the removal of brake voltage Rb154 will not be recognized by the left side of the circuit because the normally closed contact of K145 is being held open by pulsating directional voltage Ld153. Removal of brake voltage Rb154 will stop electrical power from conducting through the normally closed contact of K147 to the junction of diode D143 and voltage regulator Z140. Relay K148 will deenergize and park voltage P156 will again conduct through the normally closed contact of relay K148, through voltage regulator Z139 and reenergize the right side yellow light at D133.

Removal of the left directional voltage Ld153 at this time will deenergize relay K145 and relay K146 will discontinue operating in a pulsing mode. Park voltage from P156 will again conduct through the normally closed contact of K146 and regulator Z138 to power on the left yellow light at D130.

At this time with both left and right side yellow lights powered on and pulsating right directional voltage applied to said circuit at Rd136, said pulsating voltage conducts to the junction of D151 and D152, through D151 to charge capacitor C144 and hold K147 energized opening its' normally closed contact preventing brake signal voltage from Rbl54 from conducting through relay K147 to regulator Z140. Said right side pulsating voltage conducts through diode D152 to energize relay K148 in a pulsing mode. The normally closed contact of K148 will conduct the park voltage from P156 to regulator Z139 in a pulsing mode to electrically pulse the right side yellow light at D133. When right side directional voltage is removed from Rd136 relay K147 and K148 will deenergize and park voltage from P156 will conduct in a steady mode through the normally closed contact of K148, through regulator Z139 to the right side yellow light at D133.

Note: The detailed description of the operation of the electrical circuits in the following three FIGS. 2, 3, and 4 will be given using component designations.

In the FIG. 2 drawing the connection of electrical components to form a control circuit for controlling an automotive two-color side marker light system in compliance with Federal Motor Vehicle Standard No. 108, for automotive vehicles with OEM installed combination red brake, red directional lights is disclosed. During no input signal conditions, (the absence of directional light or brake light signal voltage to said circuit), park light voltage P221 conducts through the normally closed, (herein after NC) contact of relay (herein after K), K216 and through voltage regulator, (herein after Z), Z210 to Y225, to illuminate the left side yellow light. P221 also conducts through through the NC contact of K217 and through Z213 to Y228, to illuminate the right side yellow light.

When the vehicle brake circuit is switched on both the left brake D220 and the right brake D223 are connected to a steady vehicle power supply voltage. D220 conducts through D218 to charge capacitor, (herein after C), C214 and operate K216. P221 can no longer conduct through the NC contact of K216 extinguishing the left side yellow light. D220 is connected through Z211 to B226 to power on the left side red light. D223 conducts through D219 charging C215 and operates K217. P221 can no longer conduct through the NC contact of K217 extinguishing the right side yellow light. D223 conducts through Z212 to power on the right side red light.

If the steady left brake voltage at D220 changes to a pulsing left directional signal voltage, D220 conducts through D218 to charge C214. The electrical charge on C214 cannot conduct back through D218 and must discharge through the coil of K216. K216 is held in an energized state holding its' normally closed contact open preventing P221 voltage from reaching Y225 through Z210 maintaining the left side yellow light off. The pulsing directional voltage of D220 conducts through Z211 to B226 and powers on the left side red light in a pulsing or flashing mode. The right side brake voltage D223 is still constant and maintains the right side red light B229 in the energized state.

If vehicle brake voltage is removed at this time from D223, C215 will completely discharge through K217, K217 will deenergize and park voltage P221 will again conduct through the NC contact of K217, through Z213 to illuminate the right side yellow light at Y228. The left side red light at B226 continues in the flashing mode until the pulsing voltage is removed from left input D220.

When the pulsing voltage is removed from D220, C214 discharges through K216, the K216 NC contact closes and P221 is reconnected through Z210 to Y225 to illuminate the left side yellow light as the pulsing voltage is removed from Z211 and B226 switching off the left side red light.

If the right side input D223 is switched to the pulsing directional signal mode, it conducts through D219 to charge C215 and operate K217 opening its' NC contact and preventing P221 voltage from conducting to Z213 switching off the right side yellow light at Y228. The right side pulsing voltage at D223 is conducted through Z212 to the right side red light at B229, causing said red light to flash in unison with the right side OEM red directional light of the vehicle.

Removal of right side pulsing voltage from D223 will cause C215 to discharge through K217, K217 will deenergize and close its' NC contact causing P221 to conduct though said K217 NC contact, through Z213, and energize the right side yellow light at Y228.

In the FIG. 3 drawing the connection of electrical components to form a control circuit for controlling an automotive two-color side marker light system, in compliance with Federal Motor Vehicle Standard No. 108, for automotive vehicles with OEM installed separate red directional lights is disclosed. During no signal input conditions, (the abscense of directional light or brake light signal voltage to said circuit), park light voltage enters said circuit at P356 and conducts through the normally dosed contact of K345, through Z337, to B331 to illuminate the left side yellow light. P356 voltage also conducts through the normally closed contact of K 348, through Z340, to B334 to illuminate the right side yellow light.

Brake circuit voltage connected to Rb354 first conducts through D349, charges C341 and energizes K345. Second the Rb354 voltage conducts through D360, charges C344 and energizes K348. Third, the Rb354 voltage conducts through the normally dosed contact of K346, and through Z338 to D330 to illuminate the left side red light. Fourth, the Rb354 voltage conducts through the normally closed contact of K347, and through Z339 to D333 to illuminate the right side red light.

Pulsing left directional voltage applied at Ld353 first conducts through D359, charges C341, and energizes K345. The discharge time constant of C341 and the coil resistance of K345 holds K345 energized between applied voltage pulses of Ld353. Second said voltage Ld353 conducts through D358, and through Z338 to D330 to illuminate said left side red light in a pulsing mode. Third, said Ld353 voltage conducts through D350, charges C342 and energizes K 346 with said C342 discharge time constant holding K346 energized between Rd336 voltage pulses. Holding K345 energized removes P356 voltage from B331 extinguishing the left side yellow light. Holding K346 energized removes the constant brake voltage Rb354 from D330, the left red light, so that the pulsing left directional voltage Ld353 can be seen.

Removal of the left directional voltage Ld353 causes K346 to deenergize and removes Ld353 pulsing voltage from D330, the left red light. K345 remains energized because brake voltage Rb354 is still applied. Rb354 again conducts through the NC contact of K346 and through Z338 to illuminate the left side red light at D330.

Pulsing right directional voltage applied at Rd336 first conducts through D361, charges C 344 and energizes K348. The discharge time constant of C344 holds K348 energized between the applied directional voltage pulses. Second said Rd336 voltage conducts through D351 and Z339 to D333 to illuminate said right side red light in a pulsing mode. Third said Rd336 voltage conducts through D343, charges C357 and energizes K347 with said discharge time constant holding K347 energized between Rd336 voltage pulses. Holding K348 energized removes P356 voltage from B334 extinguishing the right side yellow light. Holding K347 energized removes constant brake voltage Rb354 from D333, the right red light, so that the pulsing right directional voltage Rd336 can be seen.

Removing brake voltage Rb354 causes K345 to deenergize and close its'NC contact. P356 voltage conducts through said contact and through Z337 to illuminate the left side yellow light at B331. Loss of Rb334 also deenergizes K348 closing its'NC contact conducting P356 voltage through Z340 to illuminate the right side yellow light at B334.

Figure 4:
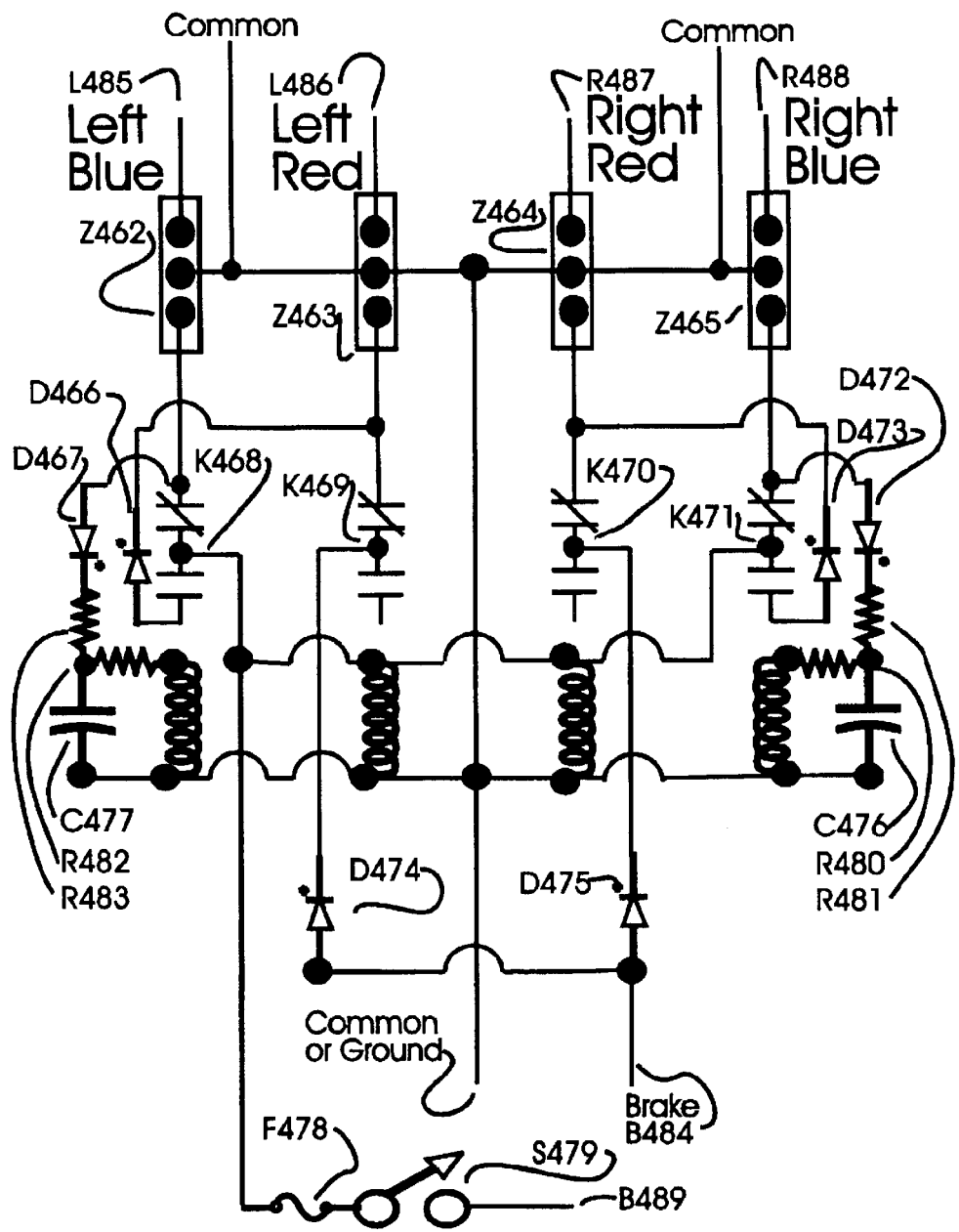
FIG. 4 shows an electrical schematic or circuit diagram of a control circuit used to operate an after market two color side marker light system that will cooperate with the vehicle brake system lights and operate as an emergency flashing signal.

In the FIG. 4 drawing the connection of electrical components to form a control circuit for controlling an automotive two-color side marker light system in compliance with Federal Motor Vehicle Standard No. 108 is disclosed. During no signal input conditions to said circuit, (the absence of brake light signal voltage or switched vehicle system electrical power), no lights of said marker light system are illuminated.

Brake light signal voltage applied to B484 is first conducted through D474, through the NC contact of K469, and through Z463 to a left side first red light source at L486. Second said B484 voltage conducts through D475, through the NC contact of K470 and through Z464 to a right side first red light source at R 487.

Switched vehicle system dc electrical power B489 is first conducted through electrical switch S479 and through fuse F478 to the coil of K469, the NC contact of K469 breaks the electrical connection between B484 and L486. Second, B489 conducts to the coil of K470 and opens the NC contact of K470 breaking the electrical connection between B484 and R487. Third, B489 conducts through the NC contact of K468, through D467, and through series resistor R483 to the junction of a parallel circuit comprised of R482 in series with the coil of K468, which is in parallel with C477. Said combination of said electrical components creates a time delay between application of electrical power B489 through the NC contact of K468 to said components and the energizing of K468. When the voltage charge of C477 reaches a sufficient value, K468 will energize breaking the electrical charge path for C477. C477 will discharge through the series path of R482 and K468 maintaining K468 in the energized state until the discharge of C477 voltage falls below the value required to maintain K468 in the energized state. The NC contact of deenergized K468 will reconnect B489 to said combination of components. This charge, discharge cycle of C477 and the associated energize and deenergize of K468 will repeat so long as source voltage B489 is maintained. A second left side illumination source at L485 is connected through Z462 to the junction of the NC contact of K468 and D466. Said first red left side illumination source at L468 is connected through Z463 and D466 to the NO contact of K468. The two said first and second left side illumination sources connected to the NC and NO contacts of K468 will cycle their illumination on and off until S479 is moved to the open condition.

The right side timing circuit comprised of K471, D472, D473 R480, R481 and C476 is connected the same as the left side timing circuit with the same component values and operates in exactly the manner as described for the left side timing circuit to illuminate said first right side red illumination source at R487 and a second right side illumination source at R488.

What is claimed is:

1. Electrical circuit apparatus to operate automotive two-color side marker: lights in compliance with U.S. Federal Motor Vehicle Standard No. 108 comprising:

a first electrical circuit to operate two-color side marker lights on a motor vehicle equipped with separate amber colored directional lights, a second electrical circuit to operate two-color side marker lights on a motor vehicle equipped with combination red directional-red stoplights, a third electrical circuit to operate two-color side marker lights on a motor vehicle equipped with separate red directional lights, and a fourth electrical circuit to operate two-color side marker lights on a motor vehicle equipped with emergency vehicle lights;

wherein the first electrical circuit controls two-color side marker lights on a vehicle first and second side that cooperate with the installed park, brake, and directional lights of the vehicle, the two-color side marker lights illuminating continuous amber colored light on a first and on a second side of a vehicle in co-operation with the vehicle park lights, until the vehicle first or second side directional signal light is operated, causing an amber side marker light on the signaled side of said vehicle to flash on and off in sequence with said vehicle first or second side amber directional light, and the amber side marker light on the non-signaled side to remain steady on;

also, operation of the vehicle red brake lights will cause the two-color side marker lights on said vehicle first and second side to illuminate red in color in unison with said vehicle red brake lights, and a two-color side marker light located on a vehicle first side will cooperate with the vehicle amber directional light and alternate amber illumination on and off in sequence with said vehicle first side operating amber directional light, coincident with a two color side marker light on said vehicle second side illuminating a steady red color in cooperation with said vehicle red stop light indication;

wherein the second or third electrical circuit controls two-color side marker lights on a vehicle first and second side that cooperate with the installed park, brake, and directional lights of the vehicle, the two-color side marker lights illuminating continuous amber colored light on a first and on a second side of a vehicle in co-operation with the vehicle park lights, until the vehicle first or second side red directional signal light is operated, causing the amber side marker light on the signaled side of said vehicle to extinguish and the red side marker light on the signaled side to flash on and off in sequence with said vehicle first or second side red directional light, and the amber side marker light on the non-signaled vehicle side to remain steady on;

also, operation of the vehicle red brake lights will cause the two-color side marker lights of said vehicle first and second side to illuminate red in color in unison with said vehicle red brake lights, and a two-color side marker light located on a vehicle first side will cooperate with the vehicle red directional signal light and alternate red illumination on and off in sequence with the vehicle first side operating red directional light, coincident with a two color side marker light on the vehicle second side illuminating a steady red color in cooperation with said vehicle red stop light indication;

wherein the fourth electrical circuit controls two-color side marker lights on a vehicle first and second side that, in a first electrical switch controlled mode of operation, will co-operate with the vehicle red brake light system, illuminating red in color when said vehicle red brake lights are illuminated, and not illuminating when said vehicle red brake lights are not illuminated;

or operating in a second electrical switch controlled mode of operation, wherein the first mode of operation is switched off and the second mode of operation is switched on, said second mode of operation activating the alternate illumination of both colors of both side marker lights simultaneously, on both a first and second side of the vehicle, in a continuous uninterrupted sequence, until the electrical switch is returned to the first switch controlled mode of operation.

* * * * *